(No Model.) 2 Sheets—Sheet 1.

F. K. KEMPSON.
TRAVELING CRANE.

No. 279,765. Patented June 19, 1883.

WITNESSES
Wm A. Skinkle.
Edwin A. Newman.

INVENTOR
Frank K. Kempson
By his Attorneys,
Baldwin, Hopkins & Peyton.

(No Model.) 2 Sheets—Sheet 2.

F. K. KEMPSON.
TRAVELING CRANE.

No. 279,765. Patented June 19, 1883.

WITNESSES
Wm A. Skinkle.
Geo. W. Young

INVENTOR
Frank K. Kempson
By his Attorneys
Baldwin, Hopkins, & Peyton.

UNITED STATES PATENT OFFICE.

FRANK K. KEMPSON, OF STAMFORD, CONNECTICUT, ASSIGNOR TO THE YALE & TOWNE MANUFACTURING COMPANY, OF SAME PLACE.

TRAVELING CRANE.

SPECIFICATION forming part of Letters Patent No. 279,765, dated June 19, 1883.

Application filed April 10, 1883. (No model.)

*To all whom it may concern:*

Be it known that I, FRANK K. KEMPSON, a subject of Her Majesty the Queen of Great Britain, residing at Stamford, in the county of Fairfield and State of Connecticut, have invented certain new and useful Improvements in Traveling Cranes, of which the following is a specification, reference being had to the accompanying drawings.

The object of my invention is to provide mechanism for causing the bridge of a traveling crane to move in a line parallel to its longitudinal tracks. I am aware that this object has been accomplished by a device shown in the patent of T. A. Weston, December 25, 1877, No. 198,718, and that it is also accomplished by certain devices for which T. W. Capen has applications for patents now pending in the United States Patent Office, numbered, respectively, 90,343 and 90,636. In the device of Weston, however, the cables by which the bridge is moved are fixed, as is also the case with some of the devices of Capen. In some of the other devices of Capen the cables move, as is the case with my devices. In the devices shown by Capen, however, the grip-wheel is stationed upon the building. It is very often more convenient to place the grip-wheel for actuating the driving-cables on the bridge in connection with the crab which does the hoisting and lowering. In one form of my device I also show a means of lessening the number of guide-sheaves while accomplishing the same results.

Figure 1:
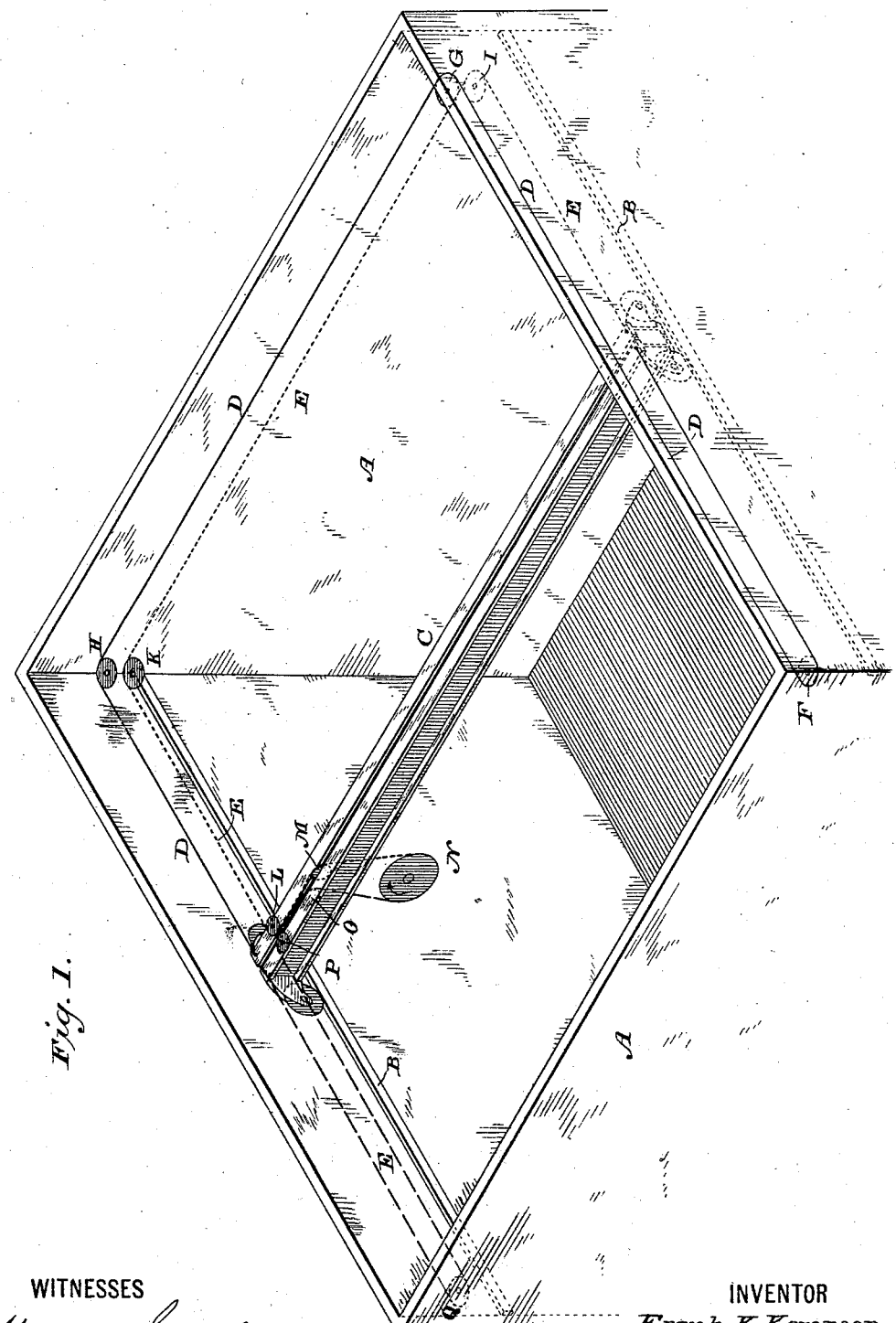
Figure 2:
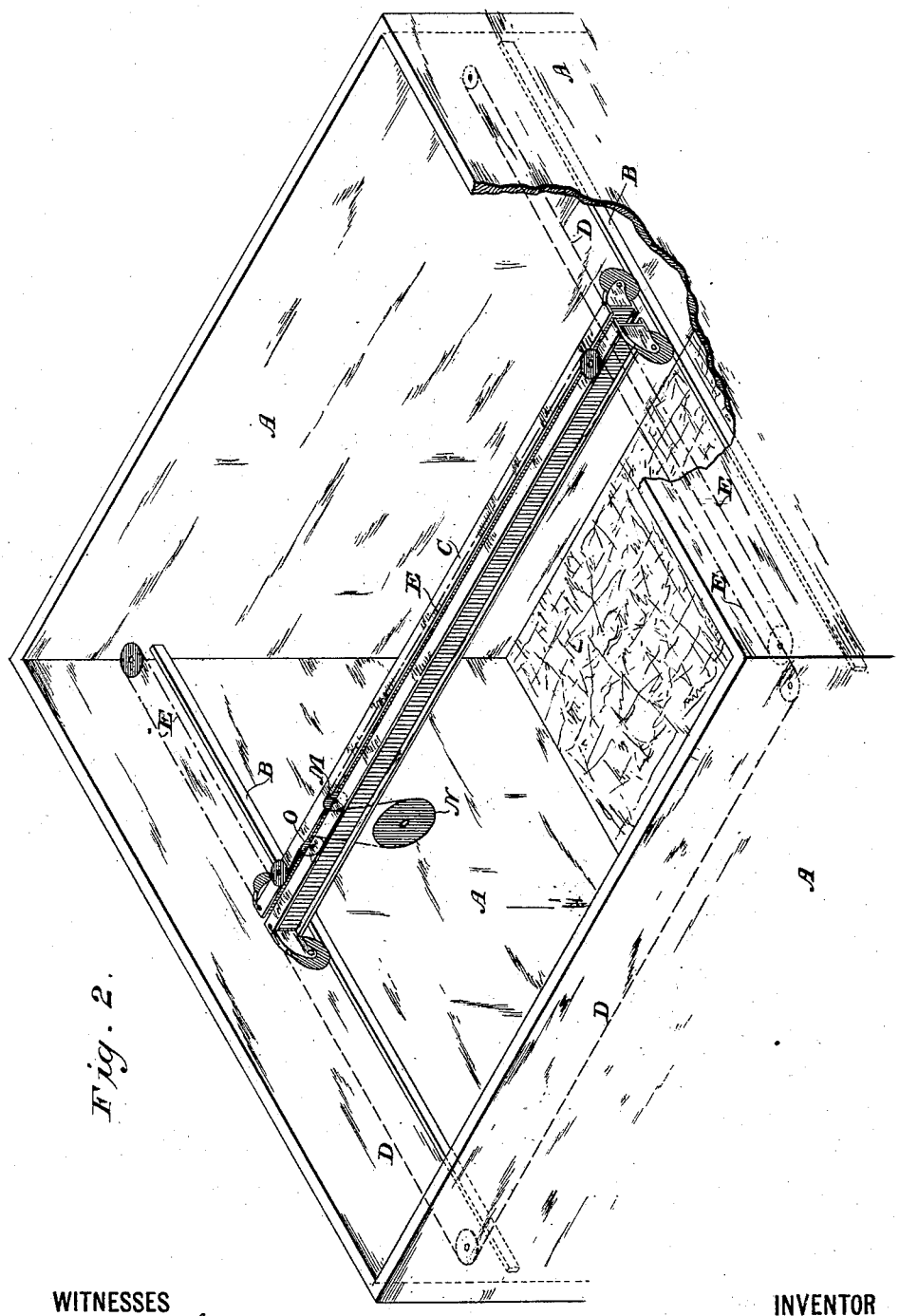

In the accompanying drawings, Figure 1 is a diagrammatic view of a suitable frame or shed, with the roof removed to display the bridge and tracks of a traveling crane which it supports. Fig. 2 is a similar view, showing a slightly different arrangement of sheaves and cables, the sheaves being one less in number.

Referring to the letters, A indicates the frame or building; B B, the tracks upon the right and left hand sides, and C the bridge upon the tracks.

D indicates the rope or cable shown in full lines, and E another cable shown in dotted or broken lines, for moving the bridge upon its tracks equally at its opposite ends, so that no swinging or binding can occur. Tracing the course of the cable D, it will be observed that it is secured to the right-hand end of the bridge, thence passes along the right-hand side of the frame around the sheave F, thence back along the same side of the frame around sheave G, thence across the end of the frame over the sheave H, thence along the left-hand side of the frame to the opposite end of the bridge, where it is again secured to the bridge. Tracing the course of the cable E, it will be observed that it is secured to the right-hand end of the bridge, thence passes along the right-hand side of the frame around the sheave I, thence along the end of the frame around the sheave K, thence along the left-hand side of the frame around the sheave L upon the bridge, thence along the bridge over the sheave M, also on the bridge, thence down around the grip-wheel N, likewise secured to or directly connected with the bridge so as to move with it, thence up over the sheave O on the bridge, thence along the bridge around the sheave P on the bridge, thence continues along the left-hand side of the frame around sheave Q, thence back to the left-hand end of the bridge, where it is again secured.

It will be observed that the cable D does not engage with any grip-wheel, and that there is but a single grip-wheel in this device around which the cable E passes. Power being applied in any suitable manner to give motion in either direction to the grip-wheel, it will pull upon the cable E, and the strain upon the opposite ends of the cable E, where it is attached to the bridge, will be communicated to the opposite ends of the cable D, and the bridge will travel precisely as if both its ends were attached to the different parts of an endless band, all parts of which move simultaneously. By my plan I accomplish the same uniform movement of the opposite ends of the bridge in either direction desired by the use of two cables, one of which passes over a single grip-wheel on the bridge.

It will be understood by those skilled in the art that power may be applied to the grip-wheel in any suitable manner—by such reversing mechanism, for example, as is illustrated in the patent of said Thomas W. Capen, No. 237,675, granted February 15, 1881.

Having thus described my invention, what I claim to be new, and desire to secure by Letters Patent of the United States, is—

1. The combination, with the bridge of a traveling crane, of a grip-wheel attached to said bridge, and a rope or cable suitably led to and connected with said bridge and passing over said grip-wheel, so that the revolution of the grip-wheel will cause the bridge to move, substantially as described.

2. The combination, with the bridge of a traveling crane, of a grip-wheel attached to said bridge, and two cables, one of which passes over said grip-wheel and causes the bridge to move when the grip-wheel is revolved, and the other of which, in connection with the first, causes the two ends of the bridge to move in the same direction at the same time and at the same speed.

3. The combination of the bridge of a traveling crane with a driving-cable which is attached to the opposite sides of opposite ends of said bridge, and which passes over guide-sheaves at the corners of the building and across said bridge, so that the movement of said cable causes either one end or the other of said bridge to move.

In testimony whereof I have hereunto subscribed my name this 27th day of March, A. D. 1883.

F. K. KEMPSON.

Witnesses:
 GEO. E. WHITE,
 SCHUYLER MERRITT.